United States Patent [19]

Lahoda et al.

[11] Patent Number: 5,316,223
[45] Date of Patent: May 31, 1994

[54] METHOD AND APPARATUS FOR CLEANING CONTAMINATED PARTICULATE MATERIAL

[75] Inventors: Edward J. Lahoda, Edgewood Borough; David C. Grant, Gibsonia; Edward F. Sverdrup, North Huntingdon, all of Pa.

[73] Assignee: Westinghouse Electric Corp., Pittsburgh, Pa.

[21] Appl. No.: 870,962

[22] Filed: Apr. 20, 1992

Related U.S. Application Data

[63] Continuation-in-part of Ser. No. 529,092, May 25, 1990, Pat. No. 5,128,068.

[51] Int. Cl.[5] .......................... G21F 9/28; C02F 1/42
[52] U.S. Cl. ........................................ 241/24; 209/18; 252/626
[58] Field of Search .............. 241/24; 252/626; 209/2, 209/18, 456, 457

[56] References Cited

U.S. PATENT DOCUMENTS

| | | | |
|---|---|---|---|
| 14,266 | 3/1817 | Bryan et al. | 209/2 |
| 414,103 | 10/1889 | Wunder | 209/2 |
| 1,097,855 | 5/1914 | Freygang | 209/2 |

(List continued on next page.)

FOREIGN PATENT DOCUMENTS

WO80/1329 6/1980 PCT Int'l Appl. .

OTHER PUBLICATIONS

Assink et al., Contaminated Soil, 1986, pp. 655-667 and 887-889.
Perry et al., Chemical Engineers Handbook, McGraw-Hill Book Co., 1973, pp. 8-25 to 8-29, 21-46.
Werther, et al., Sand from Dredge Sludge-Development of Processes for the Mechanical Treatment of Dredged Material, Technical University Hamburg-Hamburg, D 2100, Contaminated Soil Int. TNO Conf., 1st Meeting, 1985, 887-89.
Perry et al., Chemical Engineer's Handbook, 1973, pp. 20-98 to 20-103.
McCabe et al., Unit Operations of Chemical Engineering, 3rd ed., 1976, p. 771.

Primary Examiner—Douglas D. Watts
Attorney, Agent, or Firm—Daniel P. Cillo

[57] ABSTRACT

Particulate material such as for example soil contaminated with heavy metals, radioactive species and organics, singly or in combination, is treated by first washing the contaminated material with a contaminant mobilizing solution comprising a leaching agent, a surfactant or a mixture thereof. Large particles, typically greater than 5 mm are mechanically separated, washed with water and returned to the site as recovered soil. Fines, along with contaminants dissolved or dispersed in the contaminant mobilizing solution are separated from intermediate sized particles by a countercurrent flow of the contaminant mobilizing solution, preferably in a mineral jig. The intermediate sized particles are then abraded in an attrition scrubber to dislodge attached mineral slimes or fines. These additional fines are separated from the intermediate sized particles with a countercurrent flow of wash water in a second mineral jig. For some applications, the intermediate sized particles can also be abraded in an attrition scrubber prior to size separation in the first mineral jig. The slurry of intermediate sized particles and wash water discharged from the second mineral jig is dewatered to produce additional recovered soil. If the contamination includes insoluble heavy metal particles, they are separated from the effluent discharged from the second mineral jig by density separation preferably in a cross-current flow jig, prior to dewatering. Various techniques can be used to separate the fines and the contaminants dissolved and dispersed in the waste slurries discharged by the two mineral jigs used for countercurrent flow size separation from the contaminant mobilizing solution which is recycled.

33 Claims, 7 Drawing Sheets

U.S. PATENT DOCUMENTS

| | | | |
|---|---|---|---|
| 1,376,459 | 5/1921 | Pedersen | 209/2 |
| 1,458,234 | 6/1923 | Miller | 209/2 |
| 1,461,067 | 7/1923 | Moser | 209/2 |
| 3,097,159 | 7/1963 | Ofner | 209/2 |
| 4,056,464 | 11/1977 | Cross | 209/425 |
| 4,194,634 | 3/1980 | Kelly | 209/589 |
| 4,234,448 | 11/1980 | Hirano et al. | 252/301.1 |
| 4,293,438 | 10/1981 | Ledebrink et al. | 252/301.1 |
| 4,310,413 | 1/1982 | Cleaveland | 209/456 |
| 4,342,654 | 8/1982 | Lambert | 210/744 |
| 4,423,008 | 12/1983 | Yan | 423/7 |
| 4,614,579 | 9/1986 | Dorph | 209/18 |
| 4,737,315 | 4/1988 | Suzuki et al. | 252/632 |
| 4,741,866 | 5/1988 | Grantham et al. | 252/632 |
| 4,755,332 | 7/1988 | Mizuno et al. | 264/0.5 |
| 4,772,384 | 9/1988 | Schonert et al. | 209/425 |
| 4,783,253 | 11/1988 | Ayres et al. | 209/2 |
| 4,783,263 | 11/1988 | Trost et al. | 210/638 |
| 4,841,998 | 6/1989 | Bruya | 134/10 |
| 4,882,094 | 11/1989 | Rubin et al. | 252/633 |
| 4,923,125 | 5/1990 | Bateson et al. | 241/20 |
| 5,045,240 | 9/1991 | Skriba et al. | 252/626 |
| 5,056,541 | 10/1991 | Schade et al. | 134/25.1 |

_5,316,223_

METHOD AND APPARATUS FOR CLEANING CONTAMINATED PARTICULATE MATERIAL

This is a Continuation-in-part of U.S. application Ser. No. 07/529,092 filed May 25, 1990, now U.S. Pat. No. 5,128,068.

BACKGROUND OF THE INVENTION

1. Field of the Invention

This invention relates to a method and apparatus for cleaning particulate materials such as soils which are contaminated with a variety of contaminants such as heavy metals, radioactive compounds and organics, often in combination, through a combination of leaching, washing, attrition scrubbing, countercurrent flow size separation and density separation.

2. Background Information

Contaminated soil is becoming a more common environmental problem. The contaminants can include heavy metals, such as for instance, copper, lead and mercury; radioactive species such as radium, uranium and thorium; and organics such as for example, oils, polychlorinated biphenyls, flue soot and others. Various techniques have been developed to remove specific contaminants. For instance, heavy metals are known to be found predominantly in the silt, humic or clay fraction of soil. Hence, they can be removed by size separation such as tiltable tables, concurrent flow in a mineral jig and chemical techniques such as the use of precipitants. The radioactive compounds are generally soluble and can be removed to a large extent by leaching. Since these compounds are often also present in the finer particles, the most severely contaminated fraction can also be removed by countercurrent flow size separation. Organics can be removed by washing with surfactants, thermal treatment or biological processes.

Special problems develop when the different types of contaminants are present in soil. Generally, biological or thermal processes are more effective for removing organics than washing. However, toxic inorganics such as lead or chromium (+6), if present, deactivate biological systems due to their toxicity and cause air pollution problems for thermal processes. In addition, thermal processes may mobilize otherwise fixed contaminants in the treated soil.

Radioactive contamination (e.g., uranium, thorium radium, etc.) can be removed by soil washing. Soil washing provides a means to process soils having multiple contaminants. The washed soil is accessible to further biological or thermal treatment. Inorganic and radioactive compounds may be separated from organics for separate sale or disposal.

Many soil washing processes are available. Most use mining equipment to provide intimate soil/surfactant contact. U.S. Pat. No. 4,783,253 discloses a process for separating radioactive contaminants from soil using a concurrent flow of water to float away lighter uncontaminated particles from heavy contaminated particles. The slurry of lighter particles is dewatered using a spiral classifier, centrifuge, filter or the like. U.S. Pat. No. 4,783,263 is directed to a process for removing toxic or hazardous substances, in particular organics, from soils and the like by converting the material to a slurry adding surfactants and/or alkaline agents, and concentrating the toxic substance in the liquid phase preferably with a modifier in a froth flotation cell.

Some of the limitations of the currently used processes are that they are optimized for removing only one type of contaminant or for cleaning only one type of soil, they are geared to cleaning the larger particles while concentrating the fines in a fraction for later disposal, and they often use filtration for water removal which is a capital intensive operation with high operating costs.

There is a need therefore for an improved process and apparatus for treating particulate materials, such as soil and the like, contaminated with mixed wastes such as radioactive materials, organics and heavy metals.

There is a further need for such a process and apparatus which separates organic and inorganic contaminants, thereby allowing for optimum disposal routes or post treatment strategies to be used on the concentrated contamination fractions.

There is also a need for such a process and apparatus which produces a high solids content fines.

There is yet another need for such a process and apparatus which is not capital intensive, is economical to operate and can be made portable for on-site treatment.

SUMMARY OF THE INVENTION

These and other needs are satisfied by the invention which is characterized by treating particulate materials such a soils, sludges, sediments, scrap yard dust and the like, contaminated with radioactive compounds, heavy metals, and organics, either singly or in combination, by first washing the particulate material with a contaminant mobilizing solution which can consist of leaching solutions, surfactants, and mixtures thereof to mobilize soluble and dispersible contaminants in a liquid phase of the contaminant mobilizing solution. Mechanical separation means are then used to separate large particles of a size substantially free of residual contamination, typically larger than 5 mm, from intermediate sized particles and fines in the contaminant mobilizing solution. These separated large particles are washed with a water based cleaning solution to produce recovered particulate material. Fines are size separated from the intermediate sized particles in the contaminant mobilizing solution with a countercurrent flow of the contaminant mobilizing solution to form a waste slurry. The size separation is preferably performed in a mineral jig. The intermediate sized particles from which the fines have been separated are attrition abraded to dislodge attached fines. These dislodged fines are then separated from the intermediate sized particles by a countercurrent flow of wash water to form additional waste slurry and an effluent of the intermediate sized particles and wash water. The intermediate sized particles are dewatered to produce additional recovered particulate material. If the particulate material has been contaminated with insoluble metals, they can be separated from the effluent of intermediate sized particles and wash water emerging from the second size separation by density separation such as by a cross-current pulsed flow of wash water prior to dewatering.

The scrubbing of the particles removes the mineral slimes or fine particles adhering to the intermediate sized particles. As is known, these dislodged fine particles have a very large surface area which is chemically active. Some solubilized contaminants have a high affinity for the surface area of these fine particles. Hence, in accordance with the broad process defined by the invention, the dissolved contaminants are drawn off in the first size separation before scrubbing to dislodge fines. These dislodged fines are then separated in a second sizing countercurrent flow using wash water. In applications in which contamination of dislodged fines with dissolved contaminants is not a problem, another attrition abrading step can be carried out prior to the initial size separation of fines using a countercurrent flow of the contaminant mobilizing solution.

The invention is further characterized by using the water obtained by dewatering the intermediate sized particles remaining after the second size separation as the wash water for the second size separating countercurrent flow.

The countercurrent flow rate in the size separating steps can be adjusted to adjust the size of the fines removed. The adjustment is made to balance the percentage of soil particles recovered and allowable levels of residual contamination. Typically, fines smaller than about 60 microns are removed in the waste slurry. The actual size removed will be dependent upon the contaminant distribution as a function of particle size, and can vary from less than 200 to 10 microns.

Another novel aspect of the invention is the operation of a mineral jig in a countercurrent flow mode to effect size separation of fines from the slurry while simultaneously washing the particulate material. In one stage the mobilizing solution is used to produce the countercurrent flow, while wash water is used in the final size separating stage for removing fines.

The waste slurry from the two countercurrent flow size separating steps containing the fines, dissolved metals including the radioactive contaminants, and the organics, is further treated to remove the fines and contaminants and to produce clean contaminant mobilizing solution which is recirculated. In one embodiment of the invention the dissolved metals are precipitated by a sulfide. The precipitates and fine soil particles are removed by dewatering and the decontaminant mobilizing solution can be further treated such as in an ion exchange bed to remove radioactive soluble contaminants and passed through a carbon bed to remove the organic load before being recycled.

BRIEF DESCRIPTIONS OF DRAWINGS

A full understanding of the invention can be gained from the following description of the preferred embodiments when read in conjunction with the accompanying drawings in which.

DESCRIPTION OF THE PREFERRED EMBODIMENTS

The invention is suitable for treating various types of particulate materials, and especially contaminated soil, but it can also be used to treat sludges, sediments, scrap yard dust and the like. These particulate materials can be contaminated with heavy metals, organics and radioactive species either alone or in combination.

Figure 1:
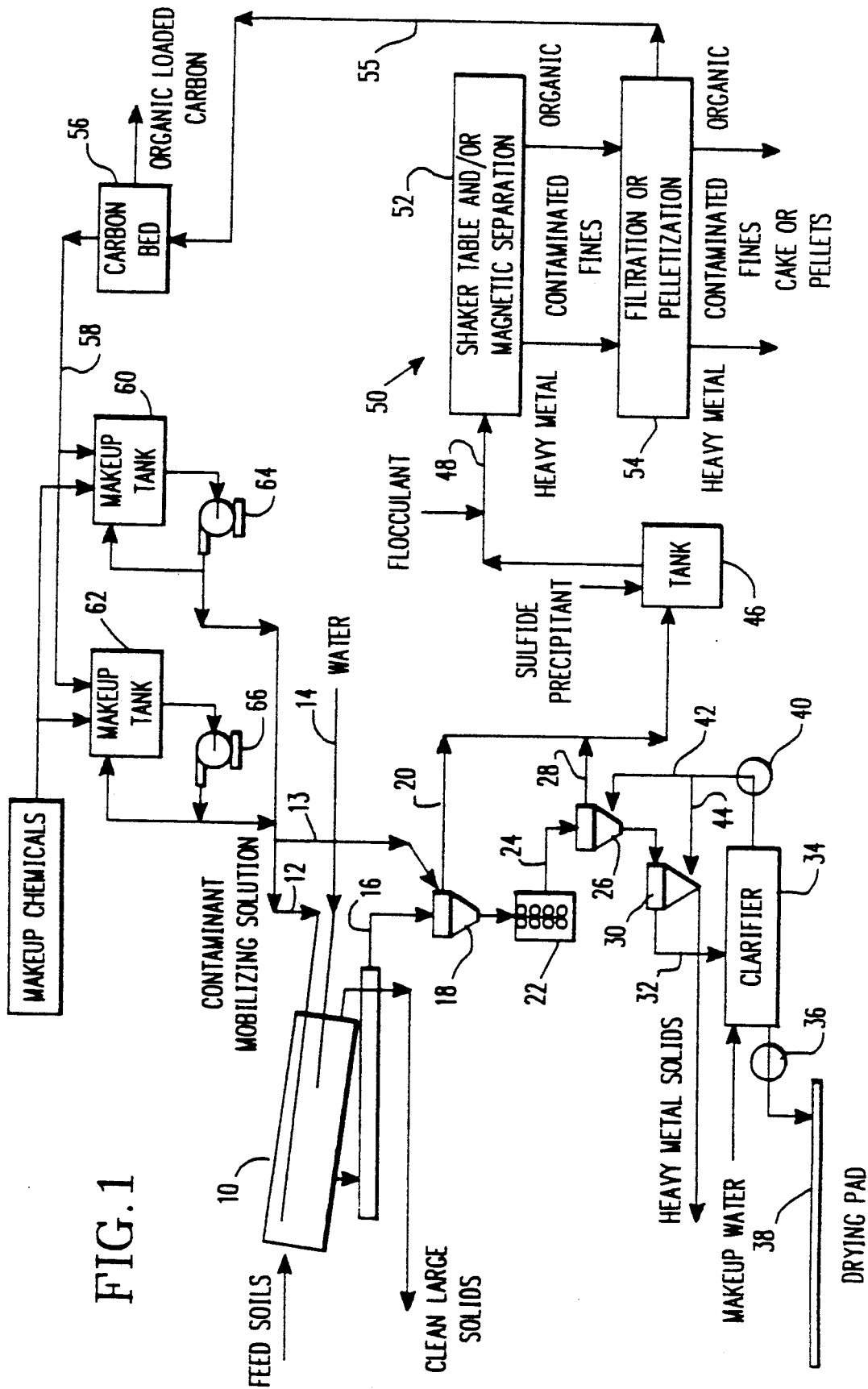
FIG. 1 is a flow sheet of a first embodiment of the invention.

FIG. 1 illustrates a first embodiment of the invention. Initially, the excavated soil is processed to remove large rocks and debris. This step is not shown in FIG. 1. The soil is then processed in a mechanical size separator 10 such as for instance a rotating drum or vibrating screen device to sort and prewash the feed soil with a contaminant mobilizing solution provided through line 12. Large pieces of soil, for instance larger than 5 mm are washed with the contaminant mobilizing solution, rinsed with water supplied through line 14, checked for residual contaminants, and returned to the site as recovered soil. The contaminant mobilizing solution used to wash the soil will be dependent upon the contamination to be removed. For soluble contaminants, the solution will contain a leaching agent. Many suitable leaching agents are known and common leaching agents suitable for leaching soluble radioactive compounds include for example potassium carbonate, sodium carbonate, acetic acid, sodium hypochloride, and others. Leaching agents for the soluble contaminants typically found in contaminated soils and the like are well known. For dispersible contaminants, the contaminant mobilizing solution contains a suitable surfactant. Again, suitable surfactants for dispersing contaminants such as oil, grease, polychlorinated biphenyls, etc., are also known. The contaminant mobilizing solution may contain various combinations of leaching agents and surfactants, again, depending on the contaminants in the soil to be cleaned.

The effluent of soil particles smaller than 5 mm and contaminant mobilizing solution discharged from the mechanical separator 10 through line 16 is then processed in a countercurrent flow size separator such as the mineral jig 18. In the jig 18, additional contaminant mobilizing solution supplied through line 13 flows upwardly countercurrent to the effluent. The fines are carried upwardly with the upward flow of contaminant mobilizing solution to form a slurry which is discharged through a line 20. These fines typically include heavy metal particles. The velocity of the upward flow of contaminant containing solution in the mineral jig 18 is set to separate fines of a desired size, for example fines smaller than 60 microns in diameter. The slurry discharged in the line 20 includes, in addition to the fines, contaminant mobilizing solution which contains leached and dispersed metals and organics.

Heretofore, mineral jigs such as that disclosed in U.S. Pat. No. 4,783,253, have only been operated in a concurrent flow mode. We operate the mineral jig 18 in a countercurrent flow mode. For such countercurrent flow operation, the jig can be operated with a stroke length of ½ to ¾ inch, a pulse frequency of 300 to 400 per min, an upflow rate of contaminant mobilizing solution of 1 to 8 liters per min, an underflow rate of 1 to 3 liters per min, with one layer of balls 3/16 inch in diameter or greater to provide a soil under flow of 80 to 95 percent and soil over the top of 20 to 5 percent.

The intermediate sized particles between 5 mm and 60 microns in diameter, which are discharged from the bottom of the mineral jig 18, are abraded in an attrition scrubber 22 which dislodges mineral slime or fines from them. The intermediate sized particles and the dislodged fines discharged from the attrition scrubber 22 through line 24 are rinsed in a second countercurrent flow size separator such as the second mineral jig 26 operated in the manner discussed above in connection with jig 18. The countercurrent flow in the second mineral jig 26 is wash water which flows upwardly at a velocity again selected to separate the dislodged fines, typically of 60 microns in diameter and smaller. The slurry of fines and wash water is discharged through line 28.

The remaining intermediate sized particles discharged from the second mineral jig 26 are processed in a density separator such as a cross-current flow jig 30 to extract higher density heavy metal solid waste particles. The mineral jig 30, which is similar to the jigs 18 and 26 is operated in the cross-current flow mode with a stroke length of ⅛ to 3/16 inch, a pulse frequency of 100–400/min, a water upflow rate of 1 to 8 liters/min, one to three layers of balls less than 3/16 inch to provide soil over the top of 80 to 95 percent and a soil underflow of 20 to 5 percent. The cross-current flow carrying the intermediate sized soil particles is discharged through a line 32 into dewatering apparatus such as, for instance, a clarifier 34 or a hydroclone. Sludge from the clarifier 34 is pumped by a pump 36 onto a drying pad 38. The dried particles recovered from the drying pad are checked for cleanliness and returned to the site as additional cleaned soil. Water removed by the clarifier 34 is circulated by a pump 40 through a line 42 as the countercurrent wash water for the second mineral jig 26, and through line 44 as the cross-current flow for the density separator jig 30.

The two waste slurry streams in the lines 20 and 28 from the first and second mineral jigs 18 and 26, respectively, are discharged into precipitation equipment 46 to which is added a precipitant to precipitate the dissolved metals. A sulfide or other suitable agent can be used to precipitate the dissolved metals present in a particular contaminated soil. These precipitates and fine soil particles will be highly contaminated with organics and metals. A flocculent, such as for example Nalco 7182, an anionic polymer that does not interfere with trace metal absorption and co-precipitation, supplied by the Nalco Chemical Company, Naperville, Ill., is added to the precipitates and fines conveyed from the precipitation equipment 46 through a line 48 to dewatering apparatus 50 which may include for instance Bardles-Mozley concentrator 52 which separate micron size particles of high specific gravity. Simultaneously, fine particles are washed by the high shear, orbital shaking of the table. Fine soil solution which is washed from the table is passed through high intensity matrix magnetic separators which remove micron sized particles coated with weakly paramagnetic hydroxides containing inorganic contaminants. Solids from the remaining solution are then separated from the stream by either filtration or flocculation settling and pelletizing in apparatus 54. The organically contaminated fractions can be further treated biologically, chemically or thermally and returned to the site.

Concentrated solids removed by the Bardles-Mozley concentrator 52 can be disposed of or sold as a concentrate. The filtrate is passed through the line 55 to an activated carbon bed 56 to remove all organics before being sent through line 58 for recycling. The recycled solution is discharged in the one of two contaminant containing solution makeup tanks 60 and 62 which is not currently being used to feed the process. The contaminated activated carbon in the bed 56 can be thermally or chemically treated or buried. The recycled contaminant mobilizing solution is analyzed and an active component such as caustic or emulsifier are made up on a batch basis in the off-line makeup tank 60 or 62. Contaminant mobilizing solution from the active one of the tanks 60 and 62 is pumped by the pump 64 or 66, respectively, through the line 12 to the mechanical size separator 10 and through the line 13 to the first mineral jig 18.

Figure 2:
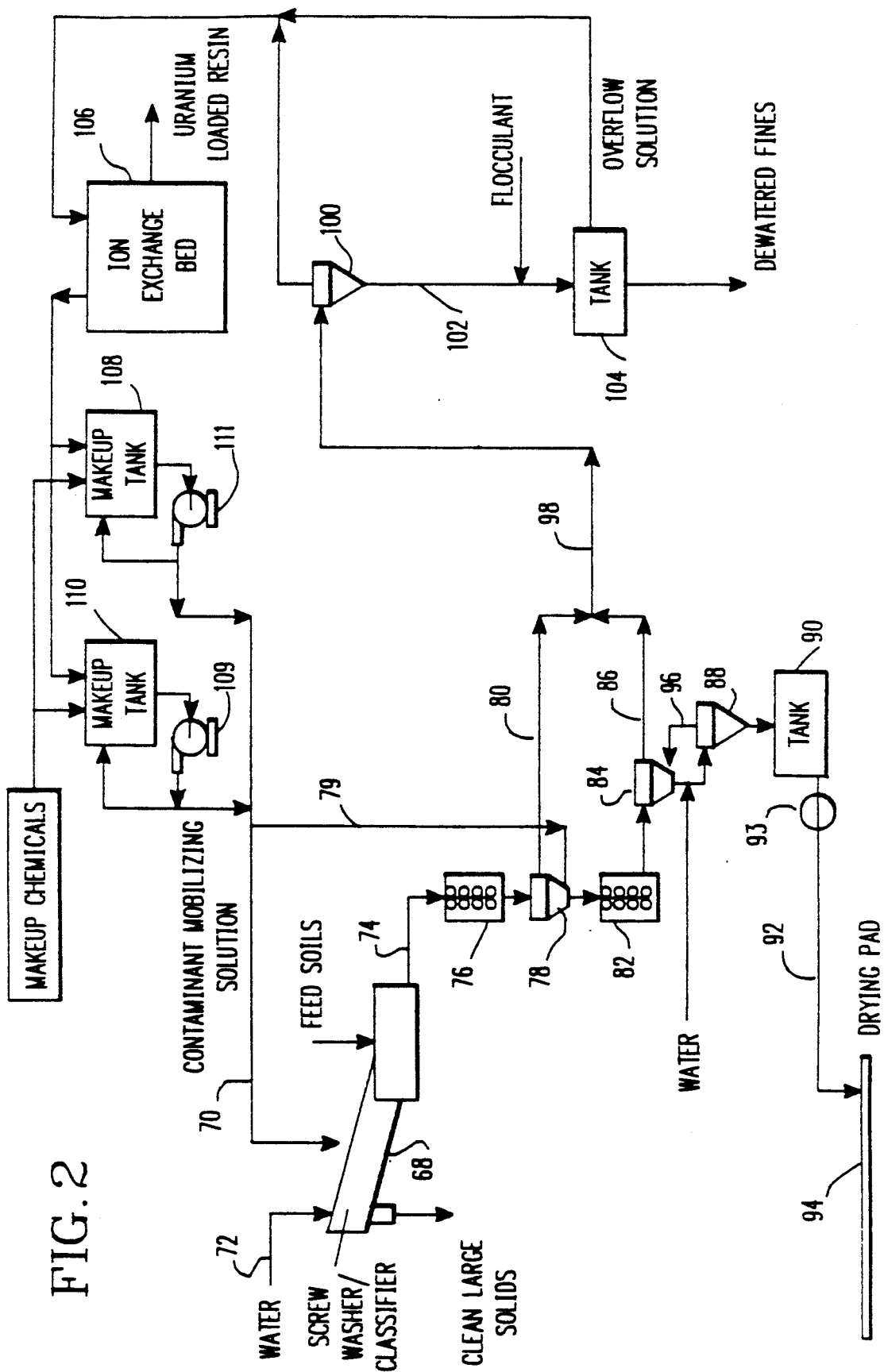
FIG. 2 is a flow sheet of a second embodiment of the invention.

FIG. 2 illustrates a modified embodiment of the invention in which the contaminated soil, after large pieces have been removed, is fed to a mechanical size separator in the form of the screw washer/classifier 68 where the soil is washed with the contaminant mobilizing solution supplied through a line 70, and where the larger particles are rinsed with a water based cleaning solution introduced through line 72 and discharged as clean large solids. The intermediate sized particles and fines are passed through a line 74 to a first attrition scrubber 76 where attached fines are dislodged from the intermediate sized particles. The abraded particles are then discharged into a countercurrent flow size separator in the form of a first mineral jig 78. The countercurrent flow in mineral jig 78 is provided by contaminant mobilizing solution supplied through the line 79. A slurry of fines and contaminant mobilizing solution containing dissolved and or dispersed contaminants is discharged from mineral jig 78 through the line 80. The intermediate sized particles are passed through a second attrition scrubber 82 where they are again abraded to dislodge additional attached fines, and a second countercurrent flow size separator in the form of a mineral jig 84 which uses an upward flow of wash water to separate the additional dislodged fines in a waste slurry which is discharged through line 86. The remaining intermediate sized particles are dewatered in a hydroclone 88 and then clarified in a tank 90. Sludge from tank 90 is deposited through a line 92 on a drying bed 94 by a pump 93 to produce additional cleaned soil to be returned to the site. Water removed by the cyclone 88 is recycled as the wash water through line 96 to the second mineral jig 84. Makeup water is added as required through line 97.

The two waste slurry streams in lines 80 and 86 are delivered through line 98 to dewatering apparatus which includes hydroclones 100. The cleaned fines from the hydroclones 100 are discharged through a line 102 into a precipitation reactor 104 to which a flocculent is added. Dewatered fines can be removed from the reactor 104 for disposal, or for further treatment. Overflow solution from the tank 104 and discharged from the cyclone 100 is recycled. Where the contaminants include radioactive compounds or heavy metals, the recycled solution can be passed through an ion exchange bed 106 to remove the soluble metals before being discharged into the contaminant mobilizing solution makeup tanks 108 and 110. Again, while makeup chemicals are being added to one makeup tank 108 or 110, contaminant mobilizing solution is being pumped by a pump 109 or 111 from the other tank to the screw washer/clarifier 68 and the first mineral jig 78.

Figure 3:
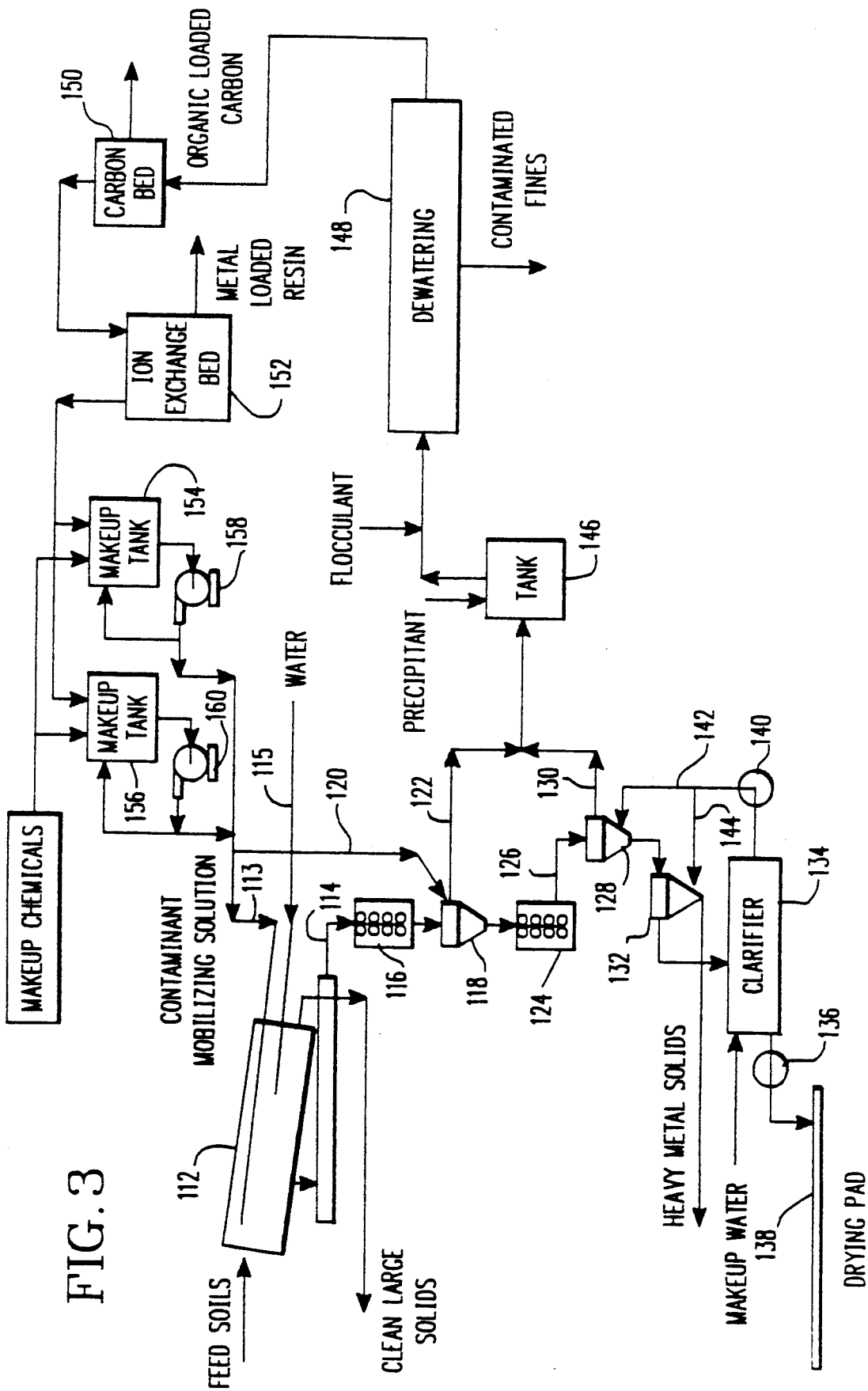
FIG. 3 is a flow sheet of yet another embodiment of the invention.

FIG. 3 illustrates yet another embodiment of the invention. This embodiment utilizes a screen/washer mechanical size separator 112 similar to that used in the first embodiment to wash the feed soils with contaminant mobilizing solution supplied through line 113 and to separate and rinse with water provided through line 115 the large particles such as those over 5 mm. The intermediate sized particles and fines are then carried through a line 114 to a first attrition scrubber 116 which dislodges attached fines from the intermediate sized particles. The fines including those dislodged in the attrition scrubber 116 are then separated from the intermediate sized particles in a countercurrent flow size separator such as the first mineral jig 118 where the countercurrent flow is contaminant mobilizing solution provided through the line 120. The waste slurry containing the fines and solubilized and dispersed contaminants is discharged through the line 122. The remaining particles are passed through a second attrition scrubber 124 and then through a line 126 to a second mineral jig 128 for size separation by the countercurrent flow of rinse water. The waste slurry containing the fines is discharged from the second mineral jig 128 through line 130.

The intermediate sized particles discharged from the second mineral jig 128 are passed through a classifier or gravity separator such as a cross-current flow jig 132 to remove heavy metal particles for disposal. The remaining intermediate sized particles are dewatered such as in clarifier 134. Again, the sludge from the clarifier 134 is discharged by pump 136 onto a drying pad 138 to produce additional clean soil. Water removed in clarifier 134 is recirculated by the pump 140 through a line 142 to supply the countercurrent flow to the second mineral jig 128 and through a line 144 to the cross-current flow jig 132.

As in accordance with the invention, the waste slurry stream in lines 122 and 130 is treated to remove the contaminants and recirculate the contaminant mobilizing solution. The particular treatment of this waste slurry depends on the type of contaminants extracted from the soil. In the embodiment shown in FIG. 3 dissolved metal contaminants are precipitated in reactor 146 and the resulting precipitants and fines are separated by dewatering which includes the addition of a flocculent. The dewatering apparatus 148 may comprise the apparatus used in the embodiments in FIGS. 1 and 2 or other dewatering apparatus. Organic contaminants are removed from the recycled contaminant mobilizing fluid in a carbon bed 150 while the soluble radioactive contaminants which were not removed by precipitation are extracted in an ion exchange bed 152. Again, the recycled contaminant mobilizing solution is returned to the one of two makeup tanks 154 and 156 which is not currently in use, and is pumped by a pump 158 or 160 from the active tank to the screen/washer 112 and the first mineral jig 118.

Figure 9:
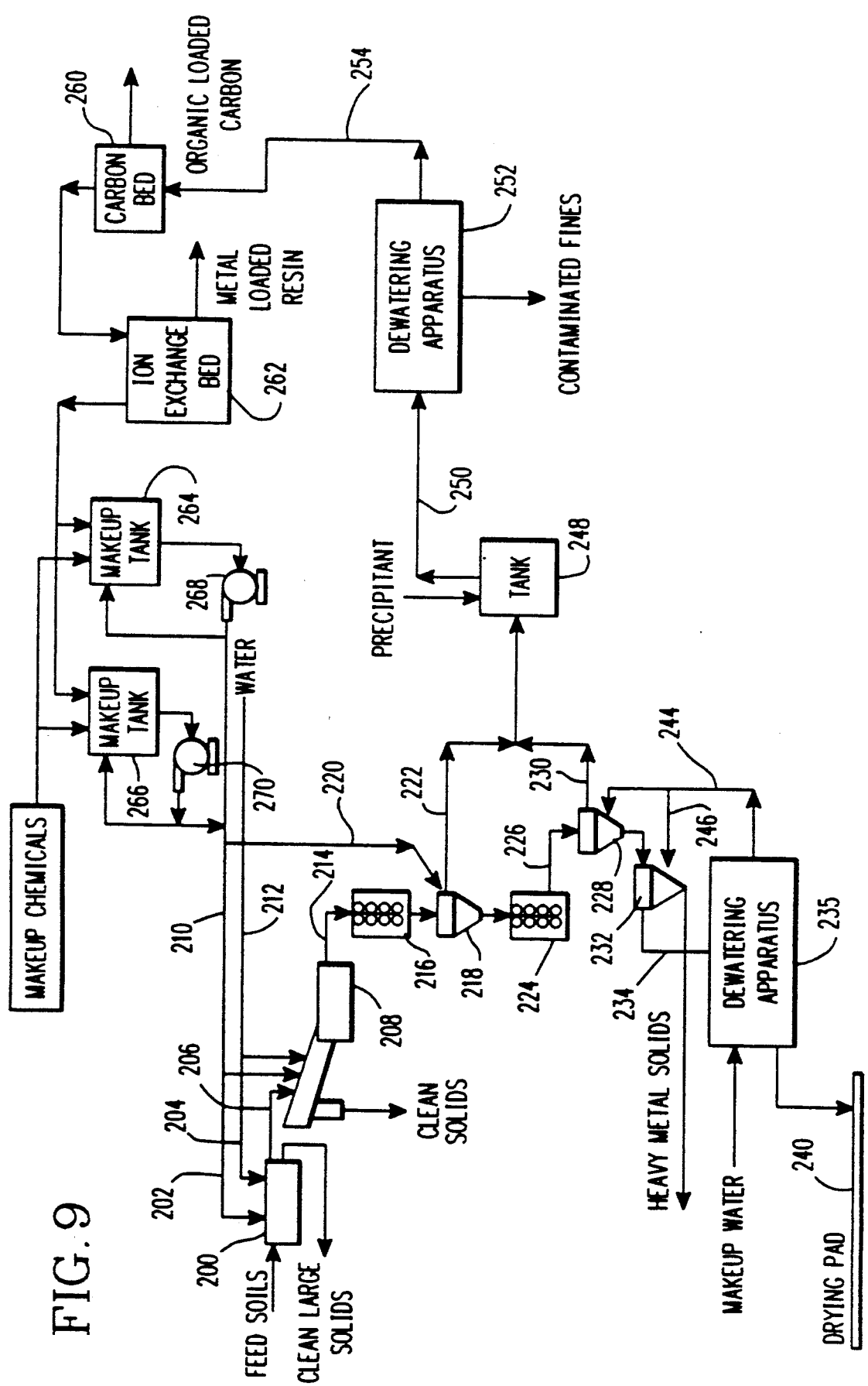
FIG. 9 is a flow sheet of yet another embodiment of the invention.

FIG. 9 illustrates yet another embodiment of the invention. This embodiment utilizes a screen/washer mechanical size separator 200 similar to that used in the first embodiment to wash the feed soils with contaminant mobilizing solution supplied through line 202 and to separate and rinse with water provided through line 204 the large particles such as those over 25 mm. Clean large particles are discharged from the screen/washer 200. The intermediate sized particles and fines, for example, those particles less than 25 mm, are then carried through a line 206 to a mechanical size separator in the form of the screw washer/classifier 208 where the soil is washed with the contaminant mobilizing, water-based solution supplied through a line 210, and where the larger particles are rinsed with water introduced through line 212 and discharged as clean solids, such as those greater than about 0.5 mm to 5 mm.

The intermediate sized particles and fines are then carried through a line 214 to a first attrition scrubber 216 which dislodges attached fines from the intermediate sized particles. The fines including those dislodged in the attrition scrubber 216 are then separated from the intermediate sized particles in a countercurrent flow size separator, such as the first mineral jig 218, where the countercurrent flow is contaminant mobilizing solution provided through the line 220. The waste slurry containing the fines and solubilized and dispersed contaminants is discharged through the line 222. The remaining particles are passed through a second attrition scrubber 224 and then through a line 226 to a second mineral jig 228 for size separation by the countercurrent flow of rinse water. The waste slurry containing the fines is discharged from the second mineral jig 228 through line 230.

The intermediate sized particles discharged from the second mineral jig 228 are passed through a classifier or gravity separator such as a cross-current flow jig 232 to remove heavy metal particles for disposal. The remaining intermediate sized particles are passed through line 234 to a dewatering apparatus 235. The dewatering apparatus 235 may include a flocculation apparatus, a clarifier, a filtration apparatus, a centrifuge, a classifier, any other dewatering devices, or any combination thereof, as required by specific soil characteristics. The water that is removed from the dewatering apparatus 235 is recirculated through a line 244 to supply the countercurrent flow to the second mineral jig 228 and through a line 246 to the cross-current flow jig 232. Solids that are discharged from the dewatering apparatus 235 can be passed to a drying pad 240 or can be further treated biologically, chemically, or thermally and returned to the site as clean soil.

As one example, the dewatering apparatus 235 may include a flocculation apparatus, a clarifier, and a filtration apparatus. The intermediate sized particles are passed to the flocculation apparatus into which a flocculent may be added to coagulate the particles. The intermediate sized particles are then passed from the flocculation apparatus to the clarifier. Sludge that is discharged from the clarifier is passed to the drying pad 240 to produce additional clean soil. Water removed from the clarifier is passed to the filtration apparatus for separating a contaminated fraction from the stream. The water that is removed from the filtration apparatus is recirculated through the line 244 to supply the countercurrent flow to the second mineral jig 228 and through the line 246 to the cross-current flow jig 232. Solids that are discharged from the filtration apparatus are tested and can be returned to the site as clean soil or are further treated biologically, chemically, or thermally before being returned to the site.

As another example, the intermediate particles may be passed from the flocculation apparatus to the clarifier without passing the water from the clarifier to the filtration apparatus. The water from the clarifier is passed directly through line 244 for recirculation of the water.

As another alternative, the intermediate particles may be passed from the flocculation apparatus directly to the filtration apparatus without passing the intermediate particles through the clarifier, for dewatering the intermediate sized particles. Solids are removed from the filtration apparatus. Water, which is discharged from the filtration apparatus, is recirculated back into the system through line 244.

As another alternative embodiment, the intermediate particles may be passed from the cross-flow jig 232 to the filtration apparatus, without passing the intermediate particles through either the flocculation apparatus or the clarifier.

As yet another alternative embodiment, the intermediate particles may be passed from the cross-flow jig 232 to a classifier. Solids removed from the classifier may be passed to the drying pad 240 and liquids removed from the classifier may be passed through line 244 for recirculation of the water. Alternatively, the intermediate particles may be passed through a flocculation apparatus prior to passage into the classifier.

As yet another alternative embodiment, the intermediate particles may be passed from the cross-flow jig 232 to a centrifuge. Solids removed from the centrifuge may be passed to the drying pad 240 and liquids removed from the centrifuge may be passed through line 244 for recirculation of the water. Alternatively, the intermediate particles may be passed through a flocculation apparatus prior to passage into the centrifuge.

Referring again to FIG. 9, the waste slurry stream in lines 222 and 230 is treated to remove the contaminants and recirculate the contaminant mobilizing solution. The dissolved metal contaminants are precipitated in a precipitation apparatus 248 and the resulting precipitant and fines are passed through line 250 into a dewatering apparatus 252 for separation. The dewatering apparatus 252 may include a flocculation apparatus, a clarifier, a filtration apparatus, a rotary screen, a centrifuge, any other dewatering devices, or any combinations thereof. Solids removed from the dewatering apparatus 252 may be further biologically, chemically, or thermally treated and returned to the site. The solids may be disposed of as contaminants or, as a result of the further treatment, may be reclaimed as a sludge with residual economic value.

Water and contaminant mobilizing solution, which is removed from the dewatering apparatus 252, is passed through line 254 to a carbon bed 260 for removing the organic contaminants to recycle the contaminant mobilizing fluid. The soluble radioactive or metal contaminants, which were not removed by precipitation, are extracted in an ion exchange bed 262. The recycled contaminant mobilizing solution is returned to the one of two makeup tanks 264 and 266 which is not currently in use, and is pumped by a pump 268 or 270 from the active tank to the screen/washer 200, screw washer/classifier 208, and first mineral jig 218.

As one example, the dewatering apparatus 252 may include a flocculation apparatus, a clarifier, and a filtration apparatus. The waste slurry stream is passed from the precipitation apparatus 248 to the flocculation apparatus through line 250. After flocculation, the waste stream is passed through a line to the clarifier. Water removed from the clarifier is passed to the filtration apparatus for further separation of the solids from the stream. During filtration, the waste slurry containing the fines is washed to remove soluble contamination. After washing of the waste slurry, the fines may be substantially clean. Solids removed from the clarifier and from the filtration apparatus that require additional treatment may be biologically, chemically, or thermally treated and returned to the site. Water removed from the filtration apparatus is passed through line 254 for recycling.

As another example, the waste slurry may be passed from the flocculation apparatus to a rotary screen prior to passing the waste slurry to the clarifier. The solids, which are removed from the rotary screen, are passed to the filtration apparatus. The liquid, which is removed from the rotary screen, is passed to the clarifier.

As an alternative embodiment, the waste slurry may be passed from the flocculation apparatus to the clarifier without passage to the filtration apparatus. The water from the clarifier is passed directly through line 254 for recirculation of the water.

As another alternative, the waste slurry may be passed from the flocculation apparatus directly to the filtration apparatus without passing the waste slurry through the clarifier, for dewatering the fines. Solids are removed from the filtration apparatus. Water, which is discharged from the filtration apparatus, is recirculated back into the system through line 254.

As another alternative embodiment, the waste slurry may be passed from the precipitation apparatus 248 to the filtration apparatus, without passing the waste slurry through either the flocculation apparatus or the clarifier.

As yet another alternative embodiment, the waste slurry may be passed from the flocculation apparatus to a centrifuge. Solids removed from the centrifuge may be further treated and liquids removed from the centrifuge may be passed through line 254 for recirculation of the water. Alternatively, the liquid may be passed to the filtration apparatus prior to passage through line 254.

Examples of soil cleanup using the various embodiments of the invention follow. The standards for these examples were the toxic chemical leaching procedures (TCLP) established for the particular site by the Environmental Protection Agency. For the first three examples, the results are illustrated in line graph form to show a continuum of the effect of the settings of the countercurrent flows in the mineral jigs which determines the size of fines removed, and consequently the percentage of the feed soil recovered.

EXAMPLE 1

Industrial site soil contaminated with about 11,000 ppm of copper was treated in accordance with the embodiment of the invention set forth in the flow chart of FIG. 1. The contaminant mobilizing solution was a one percent by weight aqueous solution of acetic acid which was used in the initial wash phase in the screen/washer 10 and in the first mineral jig 18. Water recovered from the clarifier 34 was used as the rinse in the second mineral jig 26 and the cross-current density separator 30.

Figure 4:
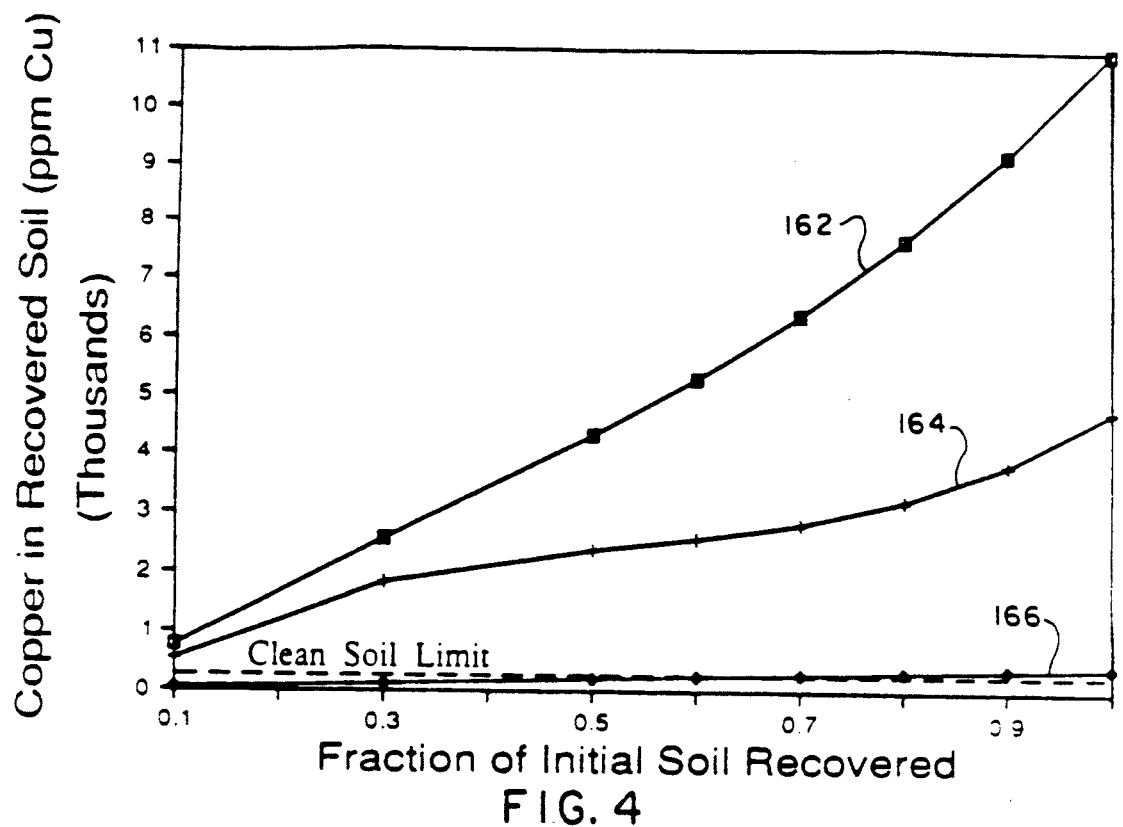
FIG. 4 is a line chart illustrating the results of an example of cleaning soil using the embodiment of the invention illustrated in FIG. 1.

The results of the tests are shown in FIG. 4. The untreated soil is represented by the trace 162, the results of soil washed only with water shown by the trace 164 and the results of the use of acetic acid as the contaminant mobilizing solution which dissolves the copper which is then carried off with the waste slurry from the mineral jigs 18 and 26 is shown by the trace 166. While the initial contamination was about 11,000 ppm of copper, it can seen that with the use of the invention, most of the copper was removed. The clean soil limit for this site was 250 ppm. It can be seen that by adjusting the countercurrent flow in the mineral jigs so that 80% of the initial soil was recovered that this clean soil limit was satisfied. Even at 90% recovery, the residual copper contamination was only 50 ppm above the clean soil limit.

EXAMPLE 2

Figure 5:
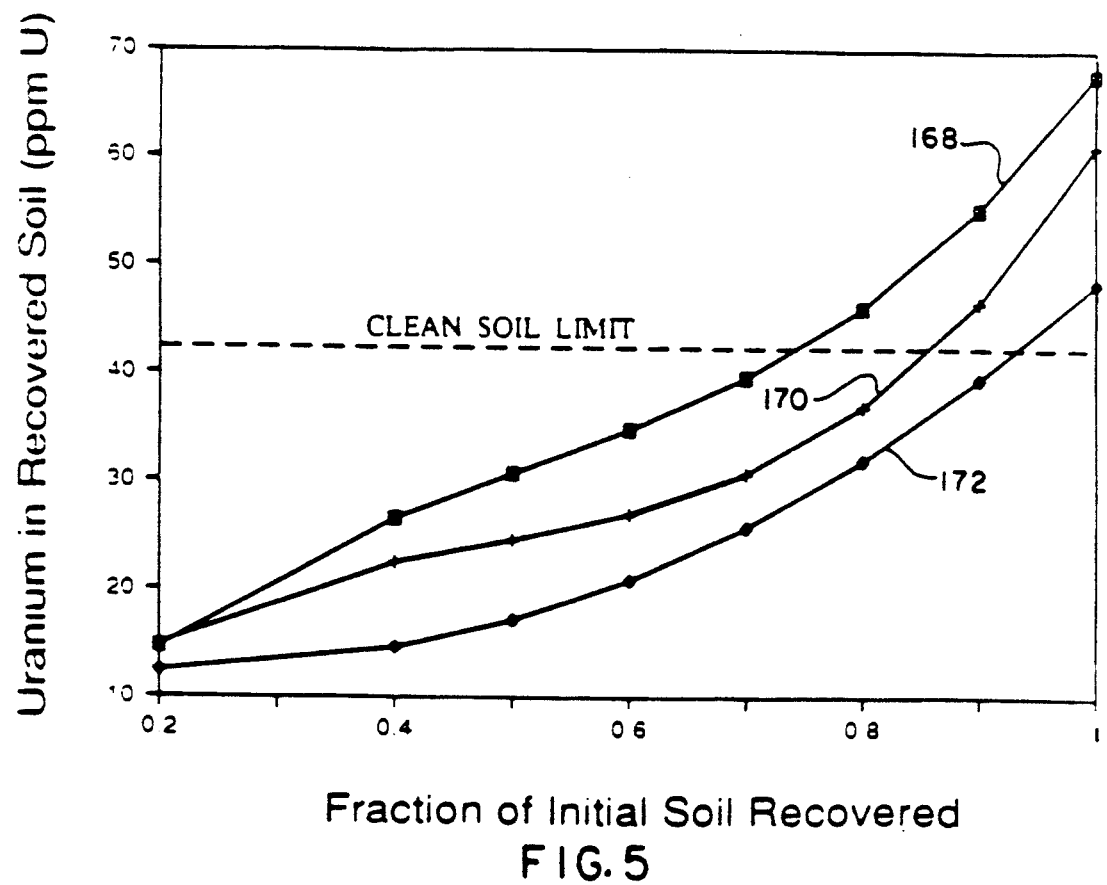
FIGS. 5 and 6 are line charts illustrating the results of two examples of cleaning soil using the embodiment of the invention illustrated in FIG. 2.

Soil contaminated with 69 ppm of radium was treated according to the embodiment of the invention shown in FIG. 2 using a 0.1 molar aqueous solution of potassium carbonate and a 0.1 molar solution of sodium carbonate as the contaminate mobilizing solution. The rinse water was the water recovered by the dewatering hydroclone 88. In FIG. 5, which illustrates the results of this example, the trace 168 represents the untreated soil, trace 170 represents soil washed only with water, and the trace 172 shows the results of the soil treated with the potassium carbonate and sodium carbonate chemical wash and rinsed with water. It can be seen from FIG. 5 that most of the contamination resides in the fine fraction so that even untreated soil from which only about 25% of the smaller particles are removed meets the clean soil limit of 42 ppm of uranium shown by the dotted line. With the invention, over 90% of the soil was recovered within the clean soil limit of 42 ppm of uranium.

EXAMPLE 3

Figure 6:
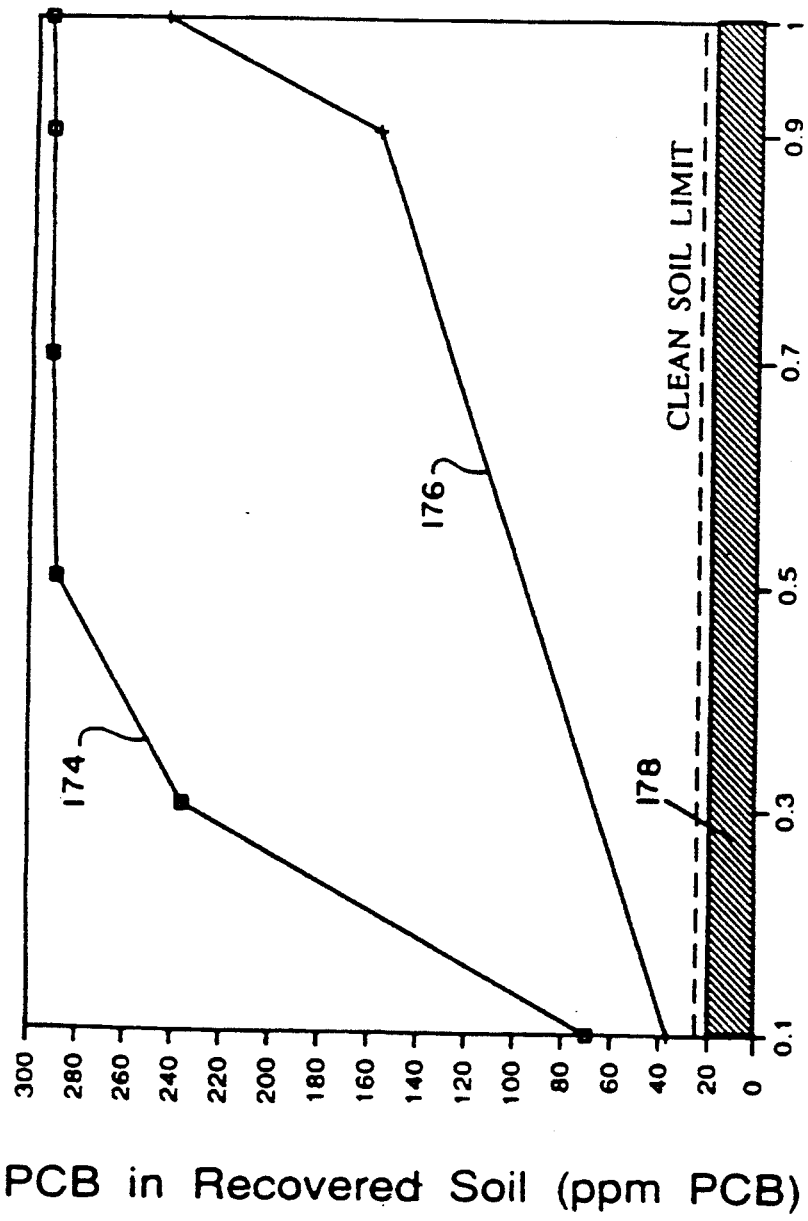

Soil contaminated with approximately 295 ppm of polychlorinated biphenyls was treated according to the embodiment of the invention illustrated in FIG. 2. The contaminant mobilizing solution in this example was a one percent by weight solution of NP90 a surfactant produced by Henkel Corporation together with a one percent by weight solution of Adsee 799, a surfactant supplied by Witco Corporation. The results of the test are shown in FIG. 6 where trace 174 is the untreated soil, trace 176 is soil washed only with water, and the cross hatched area 178 shows the results of soil washed with the surfactant solution. As can be seen, only soil treated in accordance with the invention met the clean soil limit of 25 ppm shown by the dashed line, and virtually all of the soil was recovered by this process.

EXAMPLE 4

Figure 7:
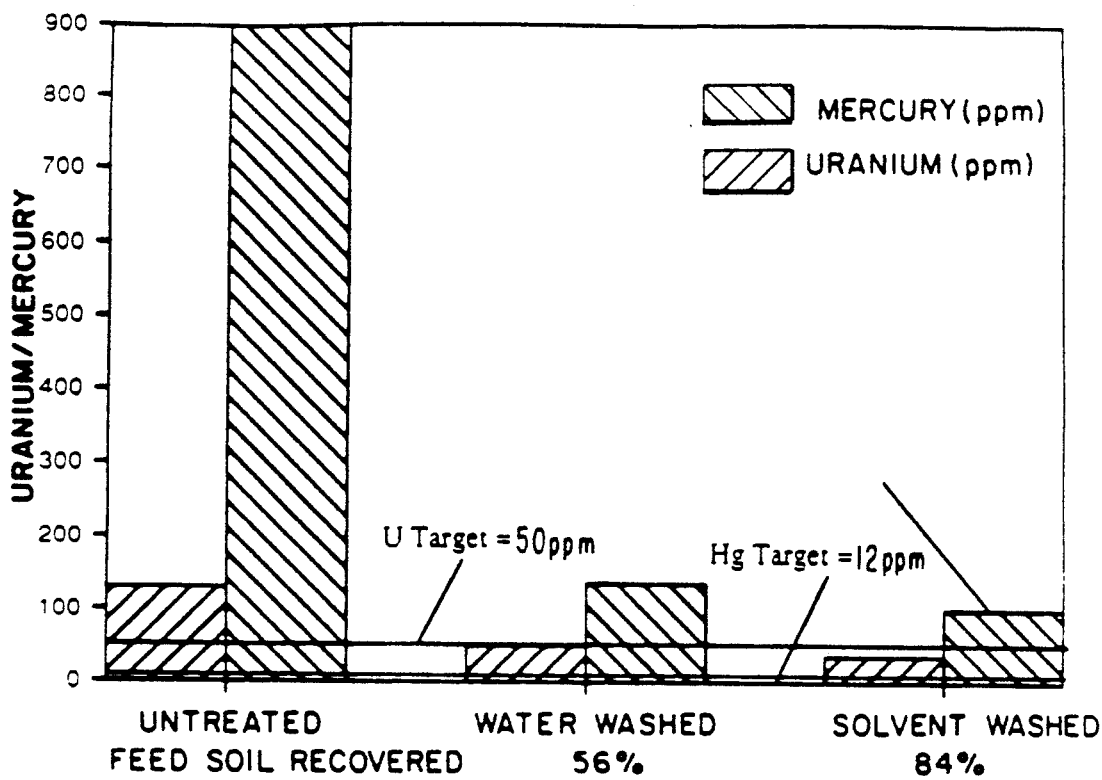
FIGS. 7 and 8 are bar graphs illustrating the results of two examples of cleaning soil in accordance with the embodiment of the invention illustrated in FIG. 3.

Sewer sediment having the following initial contaminant levels:
  Uranium—140 to 200 ppm
  Mercury—900 to 1000 ppm
  PCBs—5 to 10 ppm
the remediation requirements were:
  Uranium—50 ppm
  Mercury—12 ppm
  PCB—2 ppm
  Pass TCLP The sewer sediment was treated by attrition scrubbing and initial fines separation using a sodium hypochloride solution (20 g/l), washing with water and density separation using the embodiment of the invention illustrated in FIG. 3. The results of the test are shown in the bar chart of FIG. 7. The uranium target of 50 ppm was easily met using the invention. The chemical limit of 12 ppm of mercury was not met. However, this limit was arbitrarily set on the assumption that the mercury contamination was in the form of elemental mercury. In fact, the mercury was in the form of an intermetallic amalgam of uranium and mercury which is highly insoluble. As a result, the mercury level achieved passed the TCLP.

EXAMPLE 5

Oil land farm soil with the following initial contamination levels:
  Uranium—120 ppm
  PCB—7 to 14 ppm
  Oil/Grease—3 to 6 wt. %
was treated according to the embodiment of the invention shown in FIG. 3. The remediation requirements were as follows:
  Uranium—80 ppm
  PCB—2 ppm
  Pass TCLP Test The contaminant mobilizing solution was a surfactant mixture of 0.1 wt. % APG - 325 available from Henkel Corporation and 0.1 wt. % ASO available from Witco Corporation. This surfactant mixture was mixed with a leaching solution containing sodium hypochloride (20 g/l) and sodium carbonate (21 g/l).

Figure 8:
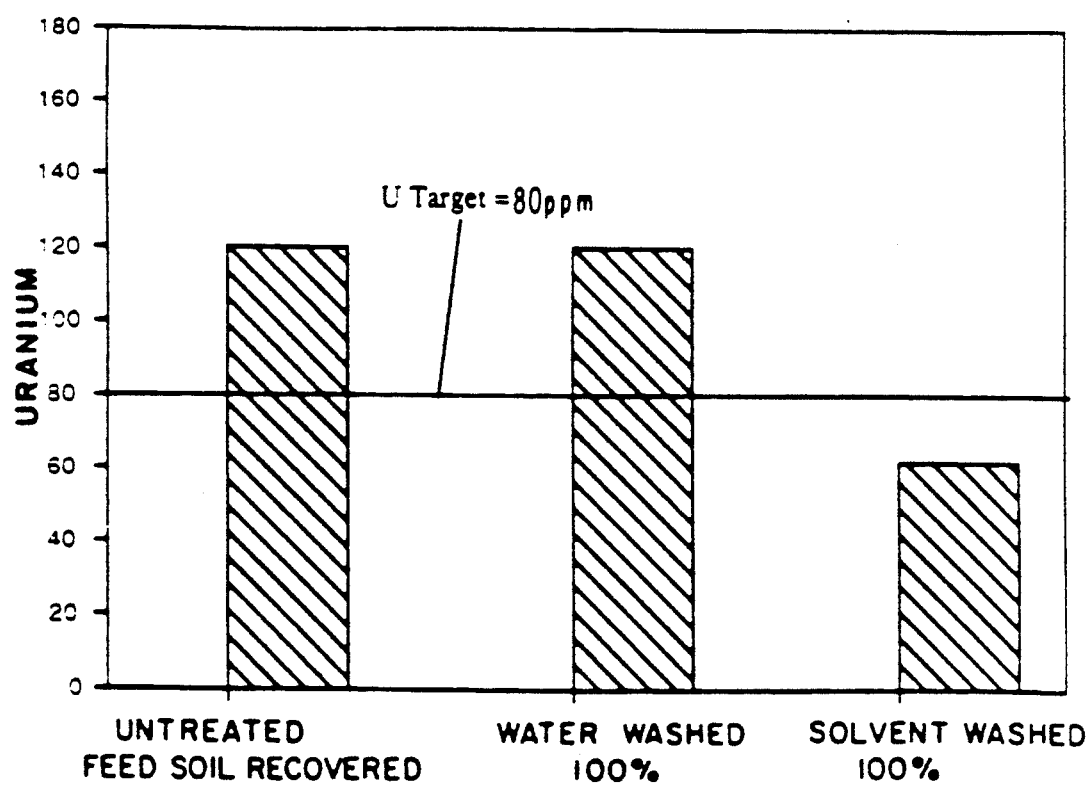

The results of this example for virtually 100% recovered soil were:
  Uranium—60 ppm
  PCB—<2 ppm
  Passed TCLP The uranium levels for untreated soil, water washed soil and soil treated in accordance with the invention are shown in FIG. 8.

From the above, it can be seen that the invention provides a versatile method and apparatus for treating various types of particulate materials contaminated with various substances. As is apparent from the above description of the basic soil washing method, it is particularly suitable for cleaning soil where a contaminant adheres to the fines of the soil that are separated from a mixture with larger, relatively less contaminated, particles. Several examples of contaminants on which the invention may be practiced have been previously mentioned but, of course, the practice of the invention is not limited to those specific examples.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. Apparatus for treating particulate materials contaminated with a contaminant, said apparatus including:
  means washing said particulate material with a contaminant mobilizing solution selected from a group consisting of leaching solutions, surfactants, and mixtures thereof, and mechanically separating large particles of a size substantially free of residual contamination from intermediate sized particles, fines and said contaminant mobilizing solution, and washing the separated large particles with water to produce recovered particulate material;
  means separating fines by size from said intermediate sized particles with a countercurrent flow of contaminant mobilizing solution to form a waste slurry;
  means abrading the intermediate sized particles from which fines have been removed from said countercurrent flow of contaminant mobilizing solution to dislodge attached fines from the intermediate sized particles;
  means separating the dislodged fines by size from the intermediate sized particles by a countercurrent flow of wash water to form additional waste slurry and an effluent of said intermediate sized particles and wash water; and means dewatering said effluent of intermediate sized particles and wash water to produce additional recovered particulate material.

2. The apparatus of claim 1 wherein said means for washing said particulate material with contaminant mobilizing solution, mechanically separating said large particles and washing said large particles with water comprise a screen washer.

3. The apparatus of claim 1 wherein said means for washing said particulate material with said contaminant mobilizing solution, mechanically separating said large particles and washing said large particles with water comprises a screw washer/classifier.

4. The apparatus of claim 1 wherein said means separating said fines by size comprise mineral jigs.

5. The apparatus of claim including means for density separating contaminated particles from said effluent of intermediate sized particles and wash water before said effluent is dewatered by said dewatering means.

6. The apparatus of claim 5 wherein said means for density separating said contaminated particles comprises a cross-current flow jig having a cross-current flow of said effluent.

7. The apparatus of claim 1 wherein said means for abrading said intermediate sized particles to remove dislodged fines comprises an attrition scrubber.

8. The apparatus of claim 1 including additional means for abrading said intermediate sized particles to initially dislodge attached fines prior to separating fines in said size separating means with the countercurrent flow of said contaminant mobilizing solution.

9. The apparatus of claim 8 wherein said means for abrading said intermediate sized particles and said additional means for abrading said intermediate sized particles both comprise attrition scrubbers.

10. The apparatus of claim 1 wherein said means for dewatering said effluent of intermediate sized particles and wash water comprises a clarifier.

11. The apparatus of claim 10 including a dewatering cyclone before said clarifier to dewater the intermediate sized particles in said effluent of intermediate sized particles and wash water.

12. The apparatus of claim 10 including a drying pad for drying intermediate sized particles dewatered in said clarifier.

13. The apparatus of claim 1 wherein said contaminant comprises heavy metals, radioactive compounds, and inorganics, singly and in combination.

14. The apparatus of claim 1 wherein said contaminant comprises inorganics, organics, and radioactive materials, singly and in combination.

15. The apparatus of claim 1 wherein said means dewatering said effluent of intermediate sized particles and wash water comprises a flocculation apparatus.

16. The apparatus of claim 1 wherein said means dewatering said effluent of intermediate sized particles and wash water comprises a filtration apparatus.

17. The apparatus of claim 1 wherein said means dewatering said effluent of intermediate sized particles and wash water comprises a centrifuge.

18. The apparatus of claim 1 wherein said means dewatering said effluent of intermediate sized particles and wash water comprises a classifier.

19. The apparatus of claim 1 including means for dewatering said waste slurry to separate a contaminated fraction.

20. The apparatus of claim 19, wherein said means for dewatering said waste slurry comprises a flocculation apparatus for coagulating particles of said waste slurry.

21. The apparatus of claim 19, wherein said means for dewatering said waste slurry comprises a filtration apparatus for separating a contaminated fraction.

22. The apparatus of claim 21 wherein said means for dewatering said waste slurry includes washing fines for removing soluble contamination.

23. The apparatus of claim 19, wherein said means for dewatering said waste slurry comprises a clarifier.

24. The apparatus of claim 19, wherein said means for dewatering said waste slurry comprises a rotary screen.

25. The apparatus of claim 19, wherein said means for dewatering said waste slurry comprises a centrifuge.

26. The apparatus of claim 1 including means for precipitating said waste slurry to precipitate dissolved metals.

27. The apparatus of claim 1 including means for magnetically separating said fine particulate solution for removing micron sized particles coated with paramagnetic hydroxides containing inorganic contaminants.

28. The apparatus of claim 1 including means for multi-gravity separating said waste slurry to produce a contaminated fraction of fines and a substantially decontaminated fraction of fines.

29. The apparatus of claim 2 wherein said means for washing said particulate material with contaminant mobilizing solution, mechanically separating said large particles and washing said large particles with water further comprises a screw washer/classifier.

30. A method of treating particulate material contaminated with a contaminant, said method comprising the steps of:

washing said particulate material with a first quantity of contaminant mobilizing solution selected from a group consisting of leaching solutions, surfactants and mixtures thereof to mobilize soluble and dispersible contaminants in the liquid phase of said contaminant mobilizing solution;

size separating a first part including fines from a second part including larger sized particles with a countercurrent flow of additional contaminant mobilizing solution to form a waste slurry, said size separating of said first part by countercurrent flow being performed by introducing said first part, said second part, and said first quantity of contaminant mobilizing solution into a size separator in a flow with a first flow direction while introducing additional contaminant mobilizing solution in a countercurrent flow with a second flow direction counter to said first flow direction whereby the fines are carried with said counterflow as part of the waste slurry;

attrition abrading the second part from which fines have been removed by said countercurrent flow of contaminant mobilizing solution to dislodge attached fines from larger sized particles; and size separating the dislodged fines from the larger sized particles by a countercurrent flow of wash water to form additional waste slurry and effluent of said larger sized particles and wash water, said size separating of said dislodged fines by countercurrent flow being performed by introducing the larger particles and dislodged fines into a size separator in a flow with a first flow direction while introducing wash water in a countercurrent flow in a second flow direction counter to said first flow direction whereby the dislodged fines are carried with said counterflow as part of the additional waste slurry and effluent.

31. The method of claim 30 wherein said contaminant comprises inorganics, organics, and radioactive materials, singly and in combination.

32. A method of treating particulate material contaminated with a contaminant, said method comprising the steps of:

washing said particulate material with a contaminant mobilizing solution selected from a group consisting of leaching solutions, surfactants and mixtures thereof to mobilize soluble and dispersible contaminants in the liquid phase of said contaminant mobilizing solution;

mechanically separating large particles of a size substantially free of residual contamination from intermediate sized particles, fines, and said contaminant mobilizing solution;

washing the separated large particles with a water based cleaning solution to produce recovered particulate material;

size separating said fines from said intermediate sized particles by a countercurrent flow of wash water to form a waste slurry and an effluent of intermediate size particles and wash water, said size separating of said fines by counter-current flow being performed by introducing the intermediate particles and fines into a size separator in a flow with a first flow direction while introducing wash water in a countercurrent flow in a second flow direction counter to said first flow direction whereby the dislodged fines are carried with said counterflow as part of the waste slurry and effluent;

density separating contaminated particles from said effluent of intermediate sized particles and wash water; and dewatering the effluent of intermediate sized particles and wash water to produce additional recovered particulate materials.

33. The method of claim 32 wherein said contaminant comprises inorganics, organics, and radioactive materials, singly and in combination.

* * * * *